United States Patent Office 3,316,319
Patented Apr. 25, 1967

3,316,319
POLYOLEFINIC SELECTIVE HYDROGENATION
Robert K. Armstrong, Glassboro, N.J., assignor to E. I. du Pont de Nemours and Company, Wilmington, Del., a corporation of Delaware
No Drawing. Filed June 4, 1964, Ser. No. 372,720
10 Claims. (Cl. 260—666)

This invention relates to a process, and more particularly to a process for the selective hydrogenation of cyclic polyolefinic hydrocarbons to produce the corresponding monoolefins.

In the hydrogenation of polyolefinic compounds having non-conjugated double bonds with similar chemical reactivities, the usual result with or without metallic catalysts is a nonselective reduction with the formation of a mixture containing large amounts of both saturated and unsaturated products. Thus, for example, in the hydrogenation of 1,5,9-cyclododecatriene or 1,5-cyclooctadiene, respectively, it is difficult to terminate the reaction at an intermediate stage and form cyclododecene or cyclooctene selectively without forming large amounts of the saturated hydrocarbon as well.

Methods have been developed for improving the selectivity in the hydrogenation reactions of cyclic polyolefins. Thus, for the reduction of cyclic polyolefins, U.S. 3,022,359 teaches the use of hydrogen transfer agents, specifically monohydric alcohols, and their mixtures with molecular hydrogen to saturate the double bonds selectively in the presence of a high surface area catalyst. Such a process has the disadvantage of requiring an additional reagent both as a solvent, and also as a reactant which is transformed in the oxidation-reduction sequence. Accordingly, a method which provides selective reduction with molecular hydrogen and does not require or consume another reducing agent is desirable. This invention affords an improvement in the process for the selective hydrogenation of non-conjugated cyclic polyolefins, having 8–16 carbon atoms, which improvement provides high yields of monoolefins and does not require or consume additional reducing agent.

The improvement of this invention is an improvement in the process for the selective hydrogenation of non-conjugated cyclic polyolefins with molecular hydrogen in the presence of catalyst which comprises carrying out the reaction in the presence of water and a palladium catalyst. Preferably, the improvement of this invention is used to selectively hydrogenate cyclic hydrocarbon di- or trienes of 8 to 16 and, preferably, 8 to 12 carbon atoms, especially 1,5,9-cyclododecatriene. Non-conjugated as used herein refers to a polyolefin wherein each site of ethylenic unsaturation is separated from the next adjacent ethylenic unsaturation by at least one saturated carbon atom. Especially high yields are obtained when divalent palladium is charged to the reaction mixture as the catalyst and particularly when the reaction is additionally carried out in the presence of dimethylformamide, dimethylsulfoxide, piperidine, or other polar water-miscible solvents. Usually, based on the weight of hydrocarbon employed, about from 50 to 150% of water and, preferably, about 100% by weight of water and a concentration of about from 0.1 to 5% and, preferably, 1 to 3% by weight of palladium catalyst calculated as palladium metal, is used. Usually, up to 40% and, preferably, 10 to 35% by weight of a polar water-miscible solvent, based on the weight of water, is added. If greater proportions of such solvents are used, more catalyst is required.

Illustrative polyolefins which can be employed in the process of this invention include 1,5-cyclooctadiene, 1,5-cyclodecadiene, 1,5,9-cyclododecatriene, 1,5,9,13-cyclohexadecatretrene, 1,5,9-trimethyl-1,5,9-cyclododecatriene, 3,7,11-trimethyl-1,5,9-cyclododecatriene, and other isomeric cyclic oligomers and cooligomers obtained from ethylene, butadiene, isoprene; piperylene; etc., as well as mixtures of such cyclic polyolefins. 1,5,9-cyclododecatriene is a particularly preferred hydrocarbon reactant. This triene is available commercially in two stereoisomeric forms. These are the cis, trans, trans and the trans, trans, trans isomers known in the art. While both isomers may be reduced according to this invention, the most selective formation of cyclododecene occurs when the cis, trans, trans isomer is utilized in this process.

In general, the preferred reaction conditions are a temperature between about 25–150° C. and a pressure sufficient to keep the hydrocarbon reactants in the liquid state, usually about 1–100 atmospheres, and preferably about 1–30 atmospheres. Reaction times will vary depending on the conditions selected, the agitation, and the catalyst activity. In the preferred embodiment of this invention the course of the reaction is followed by measuring the amount of hydrogen consumed and the reaction is terminated when the hydrogen uptake reaches the theoretical value calculated for the reduction to the monoolefin. Alternatively, detection methods for monitoring the formation of specific products can be used to follow the course of the reaction. The reaction can be carried out in organic solvents inert to hydrogenation in this system such as hydrocarbon, halocarbon, and ether solvents, for example, benzene, toluene, xylene, hexane, octane, methylene chloride, chloroform, carbon tetrachloride, ethyl ether, etc.; preferably, however the reaction is carried out in the absence of such solvents.

In the reaction, the palladium catalyst is reduced to metallic palladium, indicating that the metallic palladium and palladium in an intermediate valence state both contribute to the catalytic activity. Thus, palladium in several forms can be used, but the preferred method of operation is to add divalent palladium initially. If it is desired, the metallic palladium can be recovered and converted to the divalent form for recycle and reuse. Divalent palladium can be in the form of water-soluble palladium salts, e.g., palladium chloride, palladium sulfate, palladium nitrate, palladium acetate, etc., or in the form of $\pi$-bonded olefin complexes, such as bis-$\pi$-allyl palladium chloride, bis-$\pi$-methallyl palladium chloride and similar palladium complexes with 1,5,9-cyclododecatriene or others of the aforementioned non-conjugated cyclic polyolefins. Divalent palladium salts of strong mineral acids, especially palladium chloride, are particularly preferred. As indicated in the examples, the catalysts can be unsupported or deposited on supports in the conventional manner. Examples of supports are carbon, kieselguhr, alumina, silica, magnesia, barium sulfate, etc.

Commercial samples of olefins may contain inhibitors which function to prevent polymerization during storage and such additives may retard or alter the hydrogenation process. Generally distillation is sufficient to purify the hydrocarbon for the selective hydrogenation process, but further treatment with ion exchange resins or adsorbents can be used for purification as required.

The molecular hydrogen used in the process will be in the pure state, generally, but it can be supplied in a dilute stream containing, for example, 10 to 95% by volume of hydrogen together with other gases inert to the system such as nitrogen, carbon dioxide, argon, etc., if desired.

Cyclic monoolefins, such as those obtained by this invention, are valuable as intermediates in the preparation of epoxides, dihalides, dibasic acids, and other compounds. In particular, dibasic acids, as for example, dodecanedioic acid which can be prepared by oxidative cleavage of cyclododecene, are useful in the synthesis of lubricants, polymers, and plasticizers.

The following examples are intended to illustrate the invention. Parts and percentages are by weight unless otherwise indicated.

*Example 1*

Hydrogenations were carried out in a pressure reactor which was agitated by mechanical shaking and was connected to a reservoir for hydrogen. In each run 20.3 parts of 1,5,9-cyclododecatriene, 20 parts of water, and the catalyst were charged to the reactor, the mixture was heated to the desired temperature and hydrogen was introduced at an initial pressure of 390 p.s.i.g. The reaction was terminated when the theoretical amount of hydrogen needed to reduce two of the three double bonds was consumed. The results in the following table illustrate the selective formation of cyclododecene and the improvement in selectivity when the divalent palladium is used.

| atalyst | PdCl₂ | PdCl₂ | PdCl₂ | 5% Pd-on-Carbon | 5% Pd-on-BaSO₄ | 5% Pt-on-carbon | 5% Ru-on-carbon |
|---|---|---|---|---|---|---|---|
| atalyst (parts) | 0.5 | 0.1 | 0.5 | 0.5 | 0.5 | 1.0 | 1.0 |
| Temperature (°C.) | 150 | 150 | 100 | 100 | 150 | 150 | 150 |
| Time (hrs.) | 0.5 | 0.35 | 0.9 | 0.5 | 6.0 | 0.5 | 0.83 |
| Product Composition, wt. percent: | | | | | | | |
| Cyclododecatriene | 0.5 | 0.8 | 1.0 | 2.4 | 1.9 | 0.0 | 9.7 |
| Cyclododecadiene | 4.0 | 6.1 | 4.1 | 13.4 | 13.0 | 9.5 | 21.5 |
| Cyclododecene | 87.0 | 82.5 | 86.7 | 72.0 | 65.5 | 62.6 | 43.8 |
| Cyclododecane | 8.5 | 11.1 | 8.2 | 12.8 | 19.7 | 28.0 | 25.1 |

*Example 2*

A mixture of 20.3 parts 1,5,9-cyclododecatrient, 0.5 part palladium chloride, and 5 parts dimethylformamide was heated for 1 hr. on a steam bath, then combined with 20 parts of water, and placed in a pressure reactor which was agitated by mechanical shaking. The reaction mixture was heated to 150° C. and hydrogen was introduced into the reactor and the attached reservoir at an initial pressure of 390 p.s.i.g. The reaction was terminated after 0.4 hr. when the theoretical amount of hydrogen needed to reduce two of the three double bonds was consumed. The hydrocarbon product contained 89% cyclododecene, 8.9% cyclododecane, and 2.7% of a cyclododecadiene. No unreacted triene was detected.

*Example 3*

A mixture of 27 parts 1,5-cyclooctadiene, 0.5 part palladium chloride, and 15 parts of water was charged to a pressure reactor and reacted with hydrogen as described in Example 2. The reaction was terminated after 0.25 hr. when the theoretical amount of hydrogen needed to reduce one of the two double bonds was consumed. The hydrocarbon product contained 96% cyloocten and 4% cyclooctane.

*Example 4*

A mixture of 20 parts 1,5,9-cyclododecatriene, 5 parts dimethylformamide, and 1 part of the bis-olefin complex of palladium chloride and cyclododecatriene was combined with 15 parts water and charged to a pressure reactor and reacted with hydrogen as described in Example 2. The reaction was terminated after 0.5 hr. when the theoretical amount of hydrogen needed to reduce two of the three double bonds were consumed. The hydrocarbon product contained 88.3% cyclododecene, 8.3% cyclododecane, 3% of a cyclododecadiene, and 0.4% unreacted cyclododecatriene.

In a similar hydrogenation using a catalyst of 1.5 parts bis-π-methallyl palladium chloride in place of the triene complex, the product contained 88% cyclododecene, 8.5% cyclododecane, 2.5% of a cyclododecadiene, and 1% unreacted cyclododecatriene.

I claim:
1. In the process for the selective hydrogenation of non-conjugated cyclic polyolefins, having 8–16 carbon atoms, by reaction with molecular hydrogen in the presence of a catalyst, the improvement which comprises carrying out said reaction at a temperature of 25 to 150° C. and a pressure up to 100 atmospheres in contact with a divalent palladium catalyst and water.
2. A process of claim 1 wherein said cyclic polyolefin is 1,5,9-cyclododecatriene.
3. A process of claim 1 wherein said cyclic polyolefin is 1,5-cyclooctadiene.
4. A process for the selective hydrogenation of 1,5,9-cyclododecatriene to cyclododecene which comprises reacting 1,5,9-cyclododecatriene with molecular hydrogen at a temperature of 25 to 150° C. and a pressure up to 100 atmospheres contact with water and a divalent palladium catalyst.
5. A process of claim 4 wherein the reaction is carried out with a concentration of about from 0.1 to 5% by weight of a divalent palladium catalyst, calculated as palladium metal, and in the presence of about from 50 to 150% by weight of water, based on the weight of hydrocarbon, and additionally, up to about 40% by weight of a polar water-miscible organic solvent based on the weight of water.
6. A process of claim 5 wherein the polar water-miscible organic solvent is dimethylformamide.
7. A process of claim 5 wherein the catalyst is introduced in the form of palladium chloride.
8. A process of claim 5 wherein the catalyst is introduced in the form of a π-olefin complex of a divalent palladium salt.
9. A process of claim 8 wherein the catalyst is introduced in the form of bis-π-methallyl palladium chloride.
10. A process of claim 8 wherein the catalyst is introduced in the form of a π-complex of palladium chloride and 1,5,9-cyclododecatriene.

References Cited by the Examiner

UNITED STATES PATENTS 2,182,242  12/1939  Wooster _____ 260—666
3,009,969  11/1961  Spencer et al. _____ 260—666
3,022,359  2/1962   Wiese et al. _____ 260—666

FOREIGN PATENTS 932,226  7/1963  Great Britain.

OTHER REFERENCES

J. Chatt et al., J. Chem. Soc. 1957, pp. 3413–3417.

DELBERT E. GANTZ, *Primary Examiner.*

V. O'KEEFE, *Assistant Examiner.*